(12) United States Patent
Tong

(10) Patent No.: US 7,836,391 B2
(45) Date of Patent: Nov. 16, 2010

(54) DOCUMENT SEARCH ENGINE INCLUDING HIGHLIGHTING OF CONFIDENT RESULTS

(75) Inventor: Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 216 days.

(21) Appl. No.: 10/457,488

(22) Filed: Jun. 10, 2003

(65) Prior Publication Data

US 2004/0255237 A1    Dec. 16, 2004

(51) Int. Cl.
G06F 17/00    (2006.01)
(52) U.S. Cl. ........................ 715/234; 715/200
(58) Field of Classification Search .............. 715/501.1, 715/205, 200, 234; 707/1, 3, 5, 10, 4
See application file for complete search history.

(56) References Cited

U.S. PATENT DOCUMENTS

| | | | | |
|---|---|---|---|---|
| 5,659,732 | A * | 8/1997 | Kirsch | 707/5 |
| 5,764,906 | A | 6/1998 | Edelstein et al. | |
| 5,873,107 | A * | 2/1999 | Borovoy et al. | 715/501.1 |
| 5,983,220 | A * | 11/1999 | Schmitt | 707/5 |
| 6,006,225 | A * | 12/1999 | Bowman et al. | 707/5 |
| 6,012,053 | A * | 1/2000 | Pant et al. | 707/3 |
| 6,151,624 | A | 11/2000 | Teare et al. | |
| 6,285,999 | B1 * | 9/2001 | Page | 707/5 |
| 6,356,908 | B1 * | 3/2002 | Brown et al. | 707/10 |
| 6,499,029 | B1 | 12/2002 | Kurapati et al. | 707/5 |
| 6,564,208 | B1 * | 5/2003 | Littlefield et al. | 707/3 |
| 6,571,239 | B1 * | 5/2003 | Cole et al. | 707/5 |
| 6,601,061 | B1 | 7/2003 | Holt et al. | 707/3 |
| 6,606,615 | B1 * | 8/2003 | Jennings et al. | 706/45 |
| 6,640,218 | B1 | 10/2003 | Golding et al. | 707/2 |
| 6,990,628 | B1 * | 1/2006 | Palmer et al. | 715/234 |

(Continued)

FOREIGN PATENT DOCUMENTS

CN    1389811 A    8/2003

(Continued)

OTHER PUBLICATIONS

Brin, et al., "The Anatomy of a Large-Scale Hypertextual Web Search Engine," Computer Science Department, Stanford University, 1998, 20 pages.*

(Continued)

*Primary Examiner*—Stephen S Hong
*Assistant Examiner*—Manglesh M Patel
(74) *Attorney, Agent, or Firm*—Harrity & Harrity, LLP

(57) ABSTRACT

A search engine includes a decision component that determines whether documents that are returned in response to a user search query are likely to be very relevant to the search query. Links that refer to documents that the search engine determines to likely be very relevant may be displayed with visual cues that assist the user in browsing the links. The decision component may base its decision on a number of parameters, including: (1) the position of the document in a ranked list of search results, (2) the click through rate of the document, (3) relevance scores for the document and other documents that are returned as hits in response to the search query, and (4) whether the document is classified as a pornographic document (the search engine may refrain from showing visual cues for potentially pornographic documents).

32 Claims, 4 Drawing Sheets

U.S. PATENT DOCUMENTS

| | | | |
|---|---|---|---|
| 7,073,121 B2 * | 7/2006 | Brown et al. | 715/205 |
| 7,130,808 B1 * | 10/2006 | Ranka et al. | 705/10 |
| 7,130,819 B2 * | 10/2006 | Wang et al. | 705/26 |
| 7,289,985 B2 * | 10/2007 | Zeng et al. | 707/3 |
| 7,346,615 B2 * | 3/2008 | Bem | 707/5 |
| 7,457,802 B2 * | 11/2008 | Coleman et al. | 707/5 |
| 7,499,948 B2 * | 3/2009 | Smith et al. | 707/104.1 |
| 7,502,994 B2 * | 3/2009 | Kocol | 715/205 |
| 2002/0042738 A1 * | 4/2002 | Srinivasan et al. | 705/14 |
| 2002/0059192 A1 | 5/2002 | Ling | |
| 2002/0065802 A1 | 5/2002 | Uchiyama | 707/1 |
| 2003/0046389 A1 * | 3/2003 | Thieme | 709/224 |
| 2003/0050927 A1 * | 3/2003 | Hussam | 707/5 |
| 2003/0055816 A1 * | 3/2003 | Paine et al. | 707/3 |
| 2003/0120641 A1 * | 6/2003 | Pelletier | 707/3 |
| 2003/0126461 A1 | 7/2003 | Barker et al. | 709/229 |
| 2003/0236701 A1 | 12/2003 | Rowney et al. | 705/14 |
| 2004/0024752 A1 * | 2/2004 | Manber et al. | 707/3 |
| 2004/0044571 A1 * | 3/2004 | Bronnimann et al. | 705/14 |
| 2004/0088241 A1 * | 5/2004 | Rebane et al. | 705/37 |
| 2005/0086185 A1 * | 4/2005 | Achlioptas et al. | 706/15 |
| 2005/0137939 A1 * | 6/2005 | Calabria et al. | 705/26 |
| 2006/0095281 A1 * | 5/2006 | Chickering et al. | 705/1 |
| 2006/0167842 A1 * | 7/2006 | Watson | 707/3 |
| 2007/0038508 A1 * | 2/2007 | Jain et al. | 705/14 |
| 2008/0306819 A1 * | 12/2008 | Berkhin et al. | 705/14 |

FOREIGN PATENT DOCUMENTS

| | | |
|---|---|---|
| EP | 1 283 428 A2 | 2/2003 |
| KR | 2003-0089025 | 11/2003 |
| WO | 99/39280 | 8/1999 |
| WO | WO 2004/051515 A1 | 6/2004 |

OTHER PUBLICATIONS

Armstrong, et al. WebWatcher: A Learning Apprentice for the World Wide Web, School of computer Science, Carnegie Mellon University, 1995, 7 pages.*

Liu et al., Automatic Query Type Idenitification Based on Click Through Information, 2006, pp. 1-8.*

Xue et al., Optimizing Web Search Using Click Through Data, 2004, ACM, pp. 118-126.*

* cited by examiner

DOCUMENT SEARCH ENGINE INCLUDING HIGHLIGHTING OF CONFIDENT RESULTS

BACKGROUND OF THE INVENTION

A. Field of the Invention

The present invention relates generally to document search engines and, more particularly, to highlighting select documents returned from a search engine.

B. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web pages. Web pages that contain the user's search terms are "hits" and are returned to the user.

In an attempt to increase the relevancy and quality of the web pages returned to the user, a search engine may attempt to sort the list of hits so that the most relevant and/or highest quality pages are at the top of the list of hits returned to the user. For example, the search engine may assign a rank or score to each hit, where the score is designed to correspond to the relevance or importance of the web page. Existing techniques of determining relevance are based on the contents of the web page. More advanced techniques determine the importance of a web page based on more than the content of the web page. For example, one known method, described in the article entitled "The Anatomy of a Large-Scale Hypertextual Search Engine," by Sergey Brin and Lawrence Page, assigns a degree of importance to a web page based on the link structure of the web page. In other words, the Brin and Page algorithm attempts to quantify the importance of a web page based on more than just the content of the web page.

The goal of a search engine is to return the most desirable set of links for any particular search query. However, in addition to just returning the most desirable set of links, it may also be beneficial to present the set of links to the user in a manner that clearly and quickly informs the user of the content associated with each of the links.

One method of apprising the user of the content associated with a particular link is to also display a "snippet" of text with the link. Ideally, the snippet of text should summarize the content of the link. In practice, the snippets are typically drawn from text of the document referenced by the link. Although text snippets can be useful in summarizing the link, the quality of the snippet in accurately summarizing the link can vary based on factors such as the automated nature of snippet generation and the quality of the underlying document. Also, for snippets to be useful, the user must take time to read the snippet.

There is a need in the art for improved techniques for apprising the user of the contents of links returned in response to a search query.

SUMMARY OF THE INVENTION

A search engine returns a list of links to documents that are relevant to the search query. Links that refer to documents that the search engine determines to be very relevant to a user query may be displayed with visual cues that assist the user in browsing the links.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The detailed description does not limit the invention. Instead, the scope of the invention is defined by the appended claims and equivalents.

As described herein, a search engine may determine that it is confident that a particular link is the link that the user intended to find. The search engine may then highlight this link with a visual cue. The visual cue allows the user to quickly locate and determine whether the highlighted link is the link that the user intended to find.

System Overview

Figure 1:
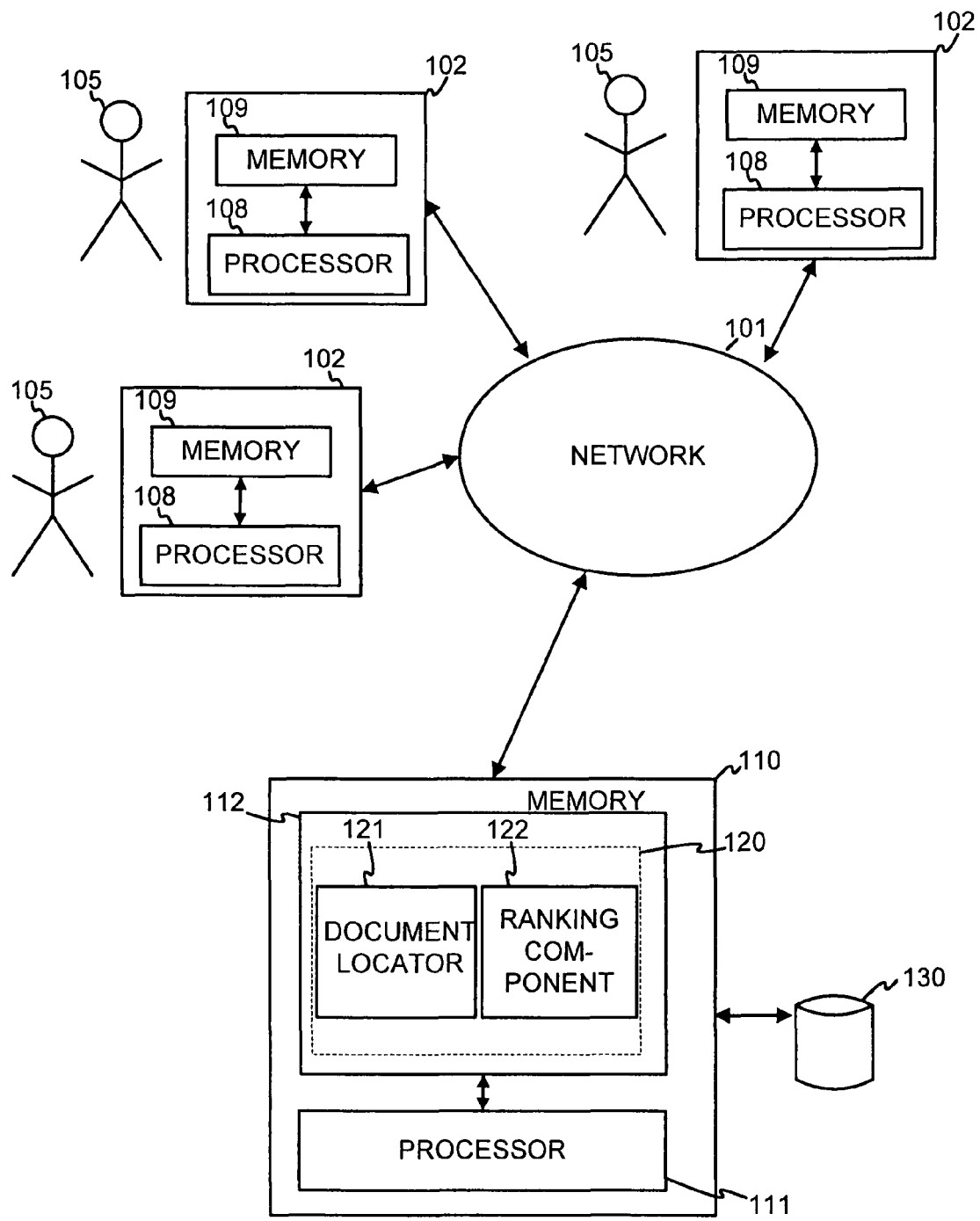
FIG. 1 is a diagram illustrating an exemplary system in which concepts consistent with the present invention may be implemented.

FIG. 1 is a diagram illustrating an exemplary system in which concepts consistent with the present invention may be implemented. The system includes multiple client devices 102, a server device 110, and a network 101, which may be, for example, the internet. Client devices 102 each include a computer-readable medium 109, such as random access memory, coupled to a processor 108. Processor 108 executes program instructions stored in memory 109. Client devices 102 may also include a number of additional external or internal devices, such as, without limitation, a mouse, a CD-ROM, a keyboard, and a display.

Through client devices 102, users 105 can communicate over network 101 with each other and with other systems and devices coupled to network 101, such as server device 110.

Similar to client devices 102, server device 110 may include a processor 111 coupled to a computer-readable memory 112. Server device 110 may additionally include a secondary storage element, such as database 130.

Client processors 108 and server processor 111 can be any of a number of well known computer processors. In general, client device 102 may be any type of computing platform connected to a network and that interacts with application programs, such as a digital assistant or a "smart" cellular telephone or pager. Server 110, although depicted as a single computer system, may be implemented as a network of computer processors.

Memory 112 contains a search engine program 120. Search engine program 120 locates relevant information in response to search queries from users 105. In particular, users 105 send search queries to server device 110, which responds by returning a list of relevant information to user 105. Typically, users 105 ask server device 110 to locate web pages relating to a particular topic and stored at other devices or systems connected to network 101. Search engine 120 includes document locator 121 and a ranking component 122. In general, document locator 121 finds a set of documents whose contents match a user search query. Ranking component 122 may rank the located set of documents based on relevance and may generate a relevance score for each document that indicates a level of relevance. Search engine 120 may then return a list of links pointing to the set of documents determined by document locator 121. The list of links may be sorted based on the relevance scores determined by ranking component 122.

Document locator 121 may initially locate documents from a document corpus stored in database 130 by comparing the terms in the user's search query to the documents in the corpus. In general, processes for indexing web documents and searching the indexed corpus of web documents to return a set of documents containing the searched terms are well known in the art. Accordingly, this functionality of document locator 121 will not be described further herein.

Ranking component 122 assists search engine 120 in returning relevant documents to the user by ranking the set of documents identified by document locator 121. This ranking may take the form of assigning a numerical value, called a relevance score, corresponding to the calculated relevance of each document identified by document locator 121. There are a number of suitable ranking algorithms known in the art, one of which is described in the article by Brin and Page, as mentioned in the Background of the Invention section of this disclosure. Alternatively, the functions of ranking component 122 and document locator 121 may be combined so that document locator 121 produces a set of relevant documents each having rank values.

As used herein, a document is to be broadly interpreted to include any machine-readable and machine-storable work product. A document may be an email, a file, a combination of files, one or more files with embedded links to other files, etc. In the context of the Internet, a common document is a Web page. Web pages often include content and may include embedded information (such as meta information, hyperlinks, etc.) and/or embedded instructions (such as Javascript, etc.).

Operation of Search Engine 120

Consistent with an aspect of the invention, links to sets of web documents returned by search engine 120 may include, in addition to text snippets that describe the web documents, a visual cue that informs the user that the web document is likely to be relevant to the user's search query. The visual cue may include graphic information through which the user can quickly and easily verify whether the link is the link that the user intended to locate. In one aspect of the invention, the link corresponding to a document that is determined to be "highly relevant" (i.e., a high confidence that the document is the document that the user would be most interested in viewing) to the user search query is displayed with the visual cue.

Figure 2:
FIG. 2 is a diagram illustrating a document that includes links to web documents displayed in response to a search query.

FIG. 2 is a diagram illustrating a document 200 that includes links to web documents that may be displayed to a user at a client device 102 in response to a search query. The document may be generated by search program 120 in response to the user search query and displayed by a web browser at one of client devices 102.

In the exemplary document shown in FIG. 2, a search query 201 entered by the user was "stanford." Document 200 includes a number of links 210, 211, 212, 213, and 214 to web documents, such as web pages, that search engine 120 determined to be potentially relevant to search query 201. In addition to the returned links 210-214, document 200 may include other information, such as the general category 215 and current events/news links 216 that correspond to search query 201.

The user may select any of links 210-214 to thereby direct the web browser to return the web document pointed-to by the links. Each of links 210-214 may also include, for example, a snippet of text 220 that describes the linked web document and a description of a category 221 in which the web document is classified.

Consistent with an aspect of the invention, one or more of the links 210-214 may contain a visual cue 230 corresponding to the link. In the example shown in FIG. 2, visual cue 230 is a miniaturized ("thumbnail") rendering of the web page corresponding to link 210. In this example, search query 201 was "stanford." Search engine 120 determined that the most highly ranked link for "stanford" is the link to the web site of Stanford University (stanford.edu). Accordingly, search engine 120 included visual cue 230 in document 200.

In some implementations, search engine 120 may only display visual cues 230 when a link is determined to be "very relevant" to the search query, where "very relevant" is defined by an objective standard for determining relevancy. For example, assume that the large majority of "stanford" search queries eventually result in the user selecting the stanford.edu link. In this situation, search engine 120 may realize that stanford.edu is a very relevant link and therefore include visual cue 230 in document 200.

By including visual cue 230 with very relevant links, users may learn to associate the visual cue with links that search engine 120 is confident matches the user's intentions. As the users begin to trust visual cue 230, the visual cue allows the user to home in on the relevant search results faster as they will not necessarily need to read the corresponding snippet 220. This may thus result in a decreased "time to satisfaction" for the user and a concomitant increase in search engine satisfaction.

Figure 3:
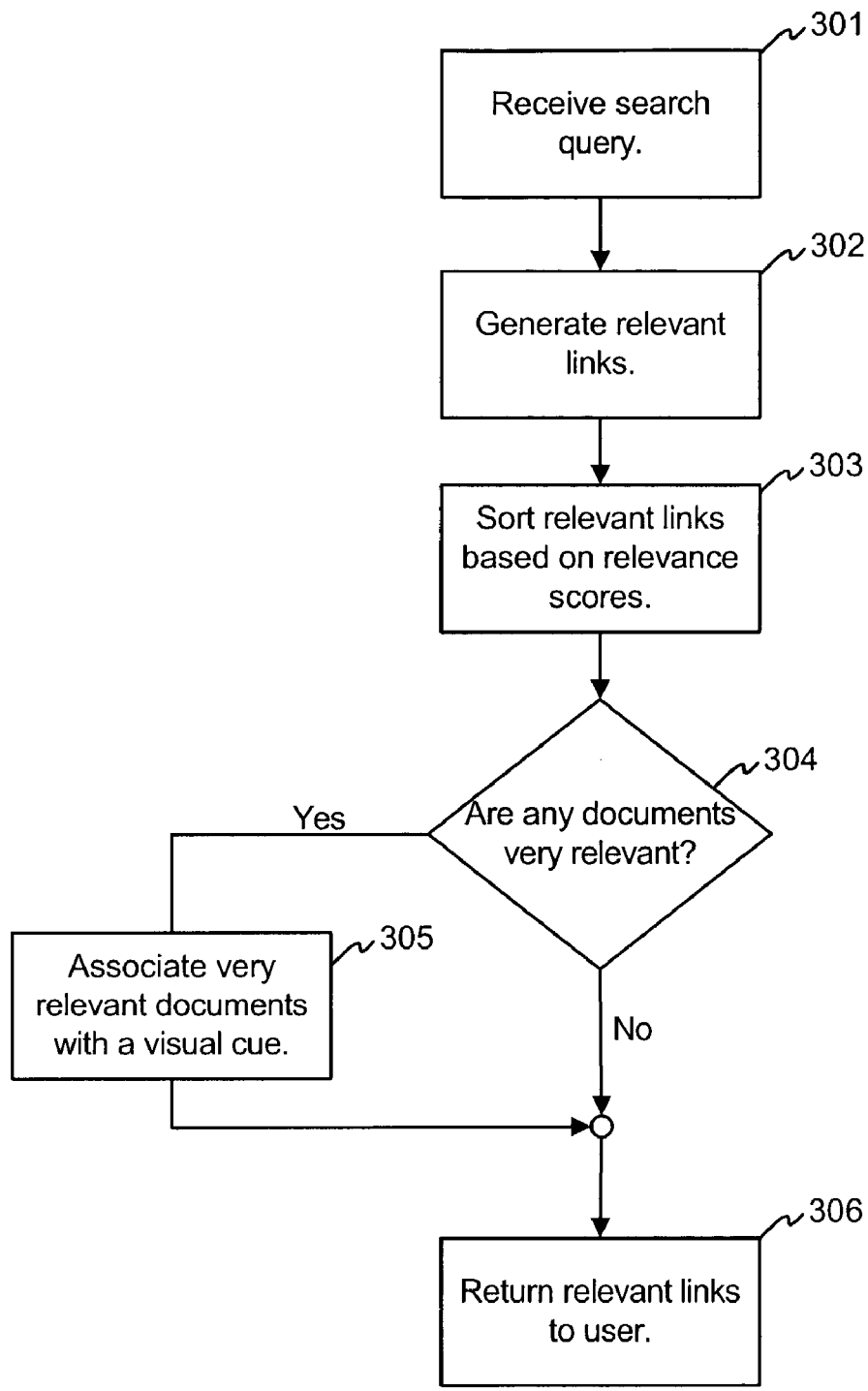
FIG. 3 is a flow chart illustrating operation of a search engine consistent with an aspect of the invention.

FIG. 3 is a flow chart illustrating operation of search engine program 120 consistent with an aspect of the invention. Search engine program 120 may begin by receiving a search query from one of users 105 (act 301). Based on the search query, document locator 121 may generate a set of links to documents that are relevant to the search query (act 302). The set of links may be sorted based on a relevance metric returned for each of the documents from ranking component 122 (act 303).

Search engine program 120 may determine whether any of the links returned by document locator 121 are associated with "very relevant" documents (act 304). Documents that are determined to be very relevant may be associated with a visual cue, such as visual cue 230 (act 305). Server device 110 may then return the set of links to the user that entered the search query (act 306). The returned set of links may be transmitted as a web document formatted in a manner similar to document 200, and may particularly include visual cues 230 associated with the very relevant documents.

Figure 4:
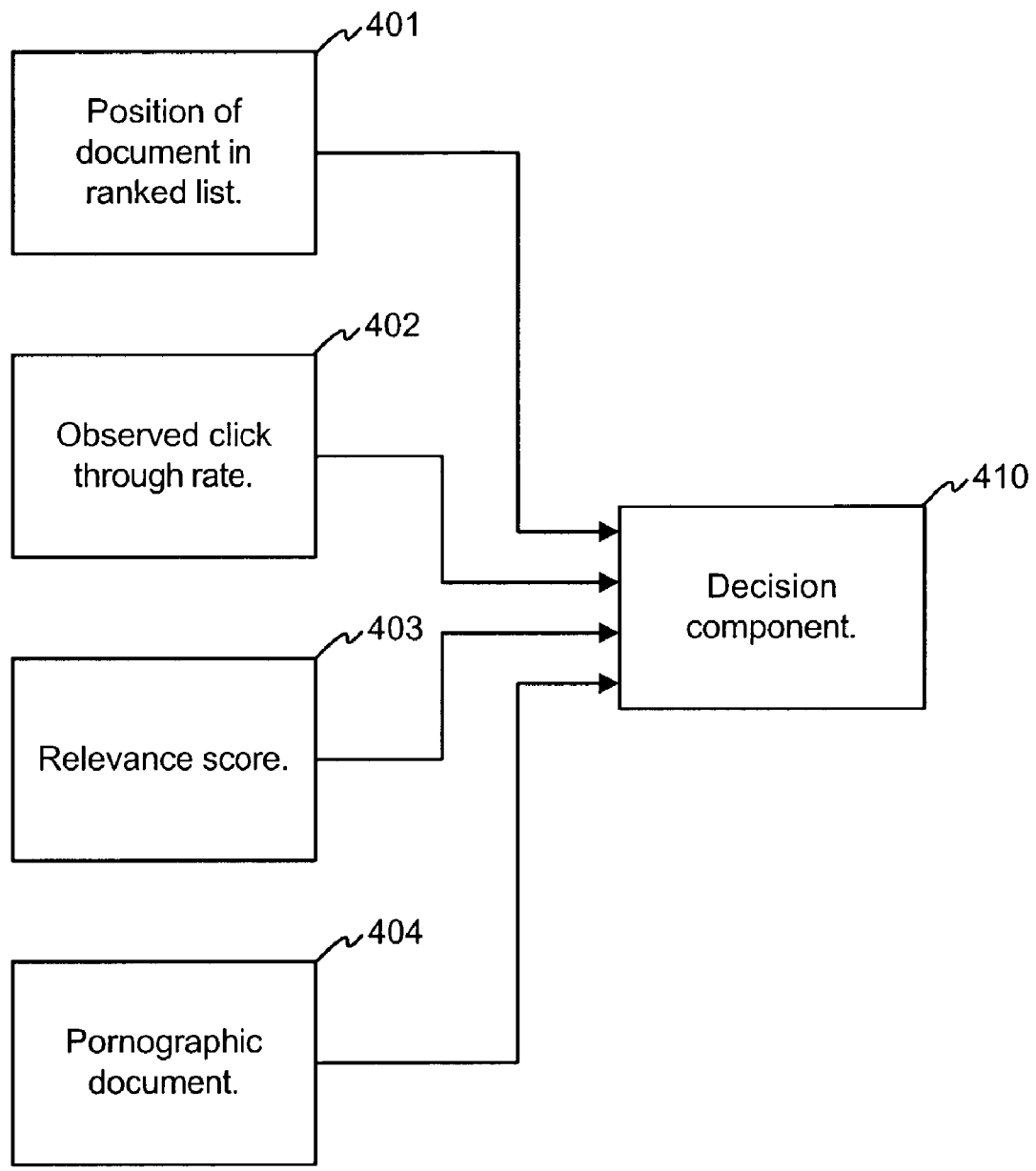
FIG. 4 is a block diagram conceptually illustrating the determination of weather a document is very relevant to a user search query.

FIG. 4 is a block diagram conceptually illustrating the determination of whether a document is very relevant by search engine program 120.

Whether a particular document, D, is very relevant may depend on a number of parameters. In one implementation, these parameters may be calculated by search engine program 120 and are shown in FIG. 4 as components 401-404. These components include the position of the document D in the ranked list of documents (component 401), the observed historical user click through rate compared to the other documents in the ranked list of documents (component 402), the relevance score for the document relative to the relevance scores for the other documents in the ranked list of documents (component 403), and whether the document is detected as being a pornographic document (component 404).

Component 401 may be determined directly based on the sorted set of links returned from ranking component 122. In general, a document at the top of the sorted list is more likely to be a very relevant document than a document further down on the list.

Component 402 may be based on a historical click through rate of other users in response to the links in the returned set of links. For example, search engine program 120 may calculate a ratio between document D and each other document in the returned set of links. The ratio may be calculated, for each other document E, as:

$$\frac{\hat{D}}{\hat{E}}, \quad (1)$$

where $\hat{D}$ represents the total number of times users have selected document D and $\hat{E}$ represents the total number of times users have selected document E. Thus, for each document E, the ratio gives the popularity of document D relative to document E. In an alternate implementation of formula (1) for measuring historical click through rates, $\hat{D}$ may be defined to represent the total number of times users have selected document D for a particular query Q and $\hat{E}$ may be defined as the number of times users clicked on any document for query Q. Component 403 may relate the relevance score for document D, as returned from ranking component 122, to the relevance score of each document E. For example, component 403 may store the differences between the relevance scores of document D and the relevance scores of the other documents.

Component 404 may store determinations of whether the document D is a pornographic document. This determination can be made based on, for example, key word comparison, domain name matching, manually entered information, etc.

Based on one or more of the parameters stored by components 401-404, decision component 410 determines whether to classify the document D as very relevant. This classification may be based on a number of functions that use the parameters stored by components 401-404. In one implementation, decision component 410 determines document D is very relevant when: (1) document D's position is first in the ranked list of results (determined based on component 401), (2) document D has a high click through rate, as may be determined by a pre-selected click through threshold (determined based on component 402), and (3) the relevance score for document D is significantly greater than the next highest relevance score in the returned set of documents (determined based on component 403). In some implementations, decision component 410 may additionally require that (4) document D is not classified as a pornographic document (determined based on component 404). The specific threshold values for the high click through rate (2) and the differences between relevance scores (3) may be determined by one of ordinary skill in the art via trial and error techniques.

Other functions, based on one or more of components 401-404, may be used by decision component 410 to determine whether a document is very relevant. For example, there may be a tradeoff between how high the click through rate for document D should be and how high the relevance score for document D should be. A high relevance score for document D is generally a good indication that document D is a good result. Accordingly, when document D has a high relevance score and is in the first position in the ranked list, decision component 410 may accept a moderate click through rate for document D and still classify the document as very relevant. On the other hand, if the relevance score for document D is low, decision component 410 may require a much higher click through rate and that the document is in the first position before classifying the document as very relevant. A similar tradeoff can be made with the click through rate and the difference in relevance scores between document D and the second place document in the ranked list. In general, one of ordinary skill in the art will recognize that other functions based on the parameters associated with components 401-404, or based on other parameters, can be used to determine whether a document is highly relevant.

Further, one of ordinary skill in the art will recognize that a number of modifications are possible to the above-discussed techniques for displaying visual cues for select documents. For example, instead of rendering the thumbnails in real-time, the thumbnails may be pre-rendered for documents that have a high click through rate. Thus, documents that are likely to be displayed with a visual cue can be quickly returned to the user without having to first generate the thumbnail. Further, visual cues other than thumbnails may be presented to the users. For example, other forms of highlighting, such as a logo, contrasting textual fonts (e.g., text contrasted by size, color, or weight) that are designed to stand out, contrasting backgrounds, or textual labels may be used in place of thumbnails.

Additionally, parameters other than the above-described parameters may be used by decision component 410. For example, a parameter related to the click through rate may be defined as the historical ratio of the number of times that users have selected document D after submitting a query to the number of times that the query was submitted.

Yet another parameter that could be used by decision component 410 is based on the text of the hyperlinks that connect web documents. In particular, this parameter may be based on the number of links pointing to document D in which the text that describes the link matches the search query. This number may be compared to the number of links pointing to the other documents in the returned set of documents in which the text of the link matches the search query.

SUMMARY

As described herein, a search engine includes a decision component that determines whether documents are highly relevant. A highly relevant document may indicate that the search engine is confident that the user who entered the search query will be interested in the document. Such documents may then be associated with a visual cue that draws the user's attention and assists the user in analyzing links returned in response to the search query.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A search engine implemented within a computer device, comprising:
    a component to receive a user search query;
    a document locator to identify documents responsive to the user search query; and
    a decision component to:
        rank the identified documents,
        calculate a click-through rate associated with each of the identified documents, and
        associate, with a link to a particular one of the identified documents, a thumbnail representation of the particular document in response to calculating that the click through rate associated with the particular document is higher, by at least a threshold amount, than the click through rates associated with all other ones of the identified documents.

2. The search engine of claim 1, where the identified documents are web documents.

3. The search engine of claim 1, where the click-through rate associated with the particular document is calculated based on a total number of times users have selected the particular document and a total number of times users have selected another one of the identified documents.

4. The search engine of claim 1, where the click-through rate associated with the particular document is calculated based on a total number of times users have selected the particular document responsive to the search query and a total number of times users have selected another one of the identified documents responsive to the search query.

5. The search engine of claim 1, where the decision component is further to associate the thumbnail representation with the link to the particular document additionally based on a relevance score for the particular document being higher, by at least a threshold amount, than relevance scores for all other ones of the identified documents.

6. The search engine of claim 1, where the decision component is further to associate the thumbnail representation with the link to the particular document based additionally on whether the particular document is classified to be a pornographic document.

7. The search engine of claim 1, where the thumbnail representation includes at least one of contrasting textual fonts, contrasting backgrounds, or textual labels.

8. The search engine of claim 1, where the click through rate associated with the particular document is based on a ratio of a number of times users have selected the particular document responsive to the search query to a number of times the search query has been received at the search engine.

9. The search engine of claim 1, where the decision component is further to associate the thumbnail representation with the link to the particular document based additionally on a parameter that defines a number of links that link to the particular document in which text of the links matches the search query.

10. A method performed by a computer system, the method comprising:
    receiving, using one or more processors associated with the computer system, a search query;
    identifying, using one or more processors associated with the computer system, links to a plurality of documents related to the search query, each of the documents having an associated relevance score in relation to the search query;
    creating, using one or more processors associated with the computer system, a ranked list including the identified links;
    associating, using one or more processors associated with the computer system, a graphic rendering with a link of the identified links, the link linking to a particular document, based on detecting that:
        a relevance score associated with the particular document is greater, by at least a threshold amount, than relevance scores associated with all other documents associated with links in the ranked list, and
        a click through rate associated with the particular document is greater, by at least a threshold amount, than click through rates associated with all other documents associated with links in the ranked list;
    and
    providing, using one or more processors associated with the computer system, the ranked list, where the associated graphic rendering is provided visually together with the link to the particular document.

11. The method of claim 10, where the documents are web documents.

12. The method of claim 10, where the graphic rendering is a thumbnail representation of the particular document.

13. The method of claim 10, where the click-through rate is calculated as a ratio representing a number of times users have selected the particular document to a number of times users have selected another one of the plurality of documents.

14. The method of claim 10, where the click-through rate is calculated as a ratio representing a total number of times users have selected the particular document in response to the search query to a total number of times users have selected another one of the plurality of documents.

15. The method of claim 10, further comprising:
    associating no graphic rendering with other ones of the identified links.

16. The method of claim 10, where the associating a graphic rendering with a link of the identified links is further based on detecting that the link to the particular document is ranked first in the ranked list.

17. The method of claim 10, where the graphic rendering includes at least one of contrasting textual fonts, contrasting backgrounds, or textual labels.

18. The method of claim 10, where the click-through rate is calculated as a ratio of a number of times users have selected the particular document in response to the search query to a number of times the search query was previously submitted.

19. The method of claim 10, where the associating a graphic rendering with a link of the identified links is further based on detecting that a number of links that link to the particular document in which text of the links matches the search query is greater than a threshold.

20. One or more storage devices containing program instructions that are executable by a processor, the one or more storage devices comprising:
one or more instructions to receive a search query;
one or more instructions to identify links to a plurality of documents related to the search query, each of the documents having an associated relevance score;
one or more instructions to rank the identified links, where the ranking is based, at least in part, on parameters other than the relevance scores;
one or more instructions to identify that the ranked identified links include a link to a particular one of the plurality of documents when:
a click through rate associated with the particular one of the plurality of documents is greater, by at least a threshold amount, than click through rates associated with all other documents in the plurality of documents, and
the relevance score associated with the particular one of the plurality of documents is higher, by at least a threshold amount, than the relevance scores associated with all other documents in the plurality of documents;
one or more instructions to associate a graphic rendering with the identified link to the particular one of the plurality of documents, when the ranked identified links include the link to the particular one of the plurality of documents; and
one or more instructions to provide the ranked identified links for display, where the associated graphic rendering is provided visually together with the link to the particular one of the plurality of documents.

21. The one or more storage devices of claim 20, where the one or more instructions to identify whether the ranked identified links include a link to a particular one of the plurality of documents are further based on a ratio representing a number of times users have selected the particular one of the plurality of documents to a number of times users have selected other ones of the plurality of documents.

22. The one or more storage devices of claim 20, where the one or more instructions to identify whether the ranked identified links include a link to a particular one of the plurality of documents are further based on a ratio representing a total number of times users have selected the particular one of the plurality of documents in response to the search query to a total number of times users have selected other ones of the plurality of documents in response to the search query.

23. The one or more storage devices of claim 20, where the one or more instructions to identify that the ranked identified links include a link to a particular one of the plurality of documents when, additionally, the link to the particular one of the plurality of documents is ranked first in the ranked identified links.

24. A computing device comprising:
a processor; and
a memory coupled to the processor, the memory including instructions that cause the processor to:
identify links to a plurality of documents related to a search query, each of the documents having an associated relevance score,
create, based on the relevance scores, a ranked list including the identified links,
compute a click-through rate for the identified links with respect to the search query,
calculate whether to associate a graphic rendering with at least one identified link based on;
whether the relevance score associated with the at least one identified link is higher, by at least a threshold amount, than the relevance scores associated with all other ones of the identified links,
whether the click-through rate associated with the at least one identified link is higher, by at least a threshold amount, than the click-through rates associated with all other ones of the identified links, and
whether the at least one identified link is associated with a pornographic document; and
provide the identified links for display, where the associated graphic rendering is provided visually together with the at least one identified link in response to calculating that a graphic rendering is to be associated with the at least one identified link.

25. The computing device of claim 24, where the instructions further cause the processor to:
not provide the associated graphic rendering visually together with the at least one identified link when the click-through rate for the at least one identified link is not higher, by at least the threshold amount, than the click-through rates of all other ones of the identified links.

26. The computing device of claim 24, where the instructions further cause the processor to calculate whether to associate a graphic rendering with the at least one identified link irrespective of the rank of the at least one identified link.

27. A system comprising:
one or more devices comprising:
means for identifying links to a plurality of documents related to a search query, each of the documents having an associated relevance score;
means for ranking the identified links;
means for calculating whether the relevance score associated with a particular one of the plurality of documents differs from the relevance scores associated with all the other ones of the plurality of documents by at least a first threshold value;
means for calculating whether a click through rate associated with the particular one of the plurality of documents differs from the click through rates associated with all the other ones of the plurality of documents by at least a second threshold value;
means for associating, with a link associated with the particular one of the plurality of documents, a graphic rendering corresponding to the particular one of the plurality of documents when the relevance score associated with the particular one of the plurality of documents differs from the relevance scores associated with all the other ones of the plurality of documents by at least the first threshold value and when the click through rate associated with the particular one of the plurality of documents differs from the click through rates of all the other ones of the plurality of documents by at least the second threshold value; and
means for providing the identified links for display, where the associated graphic rendering is provided visually together with the link associated with the particular one of the plurality of documents.

28. The device of claim 27, where one or more of the identified links that are ranked higher on the ranked list than the at least one identified link are not provided together with graphic renderings.

29. The device of claim 27, where the graphic rendering is representative of contents of the particular document.

30. A computer-program product, tangibly stored on one or more memory devices, the product comprising instructions executable to cause a processor to perform a method, the method comprising:
   receiving a search query;
   identifying a plurality of links to documents, each link having a relevance score in relation to the received search query;
   ranking the links based on the relevance scores and based, at least in part, on parameters other than the relevance scores;
   comparing, to a threshold value, differences in values among the relevance scores associated with the links;
   selecting one of the links for which a graphic indication is to be provided, the selecting being based on
      a click through rate of the selected link being higher, by at least a threshold amount, than click through rates of all other links in the plurality of links, the selecting being further based on at least one of the following parameters:
         the selected link's rank as specified by the ranking;
         the relevance score associated with the selected link being higher, by at least a threshold amount, than the relevance scores associated with all the other links in the plurality of links; or
         a classification that the selected link is associated with a pornographic document; and
   outputting the links, the ranking, and an indication that the selected link is to be displayed with the graphic indication.

31. The computer-program product of claim 30, where at least some of the outputted links are not provided with an associated graphic indication.

32. The computer-program product of claim 31, where at least one of those of the outputted links that are not provided with an associated graphic rendering has a rank that is higher than the selected link's rank.

\* \* \* \* \*